Figures 1, 2:
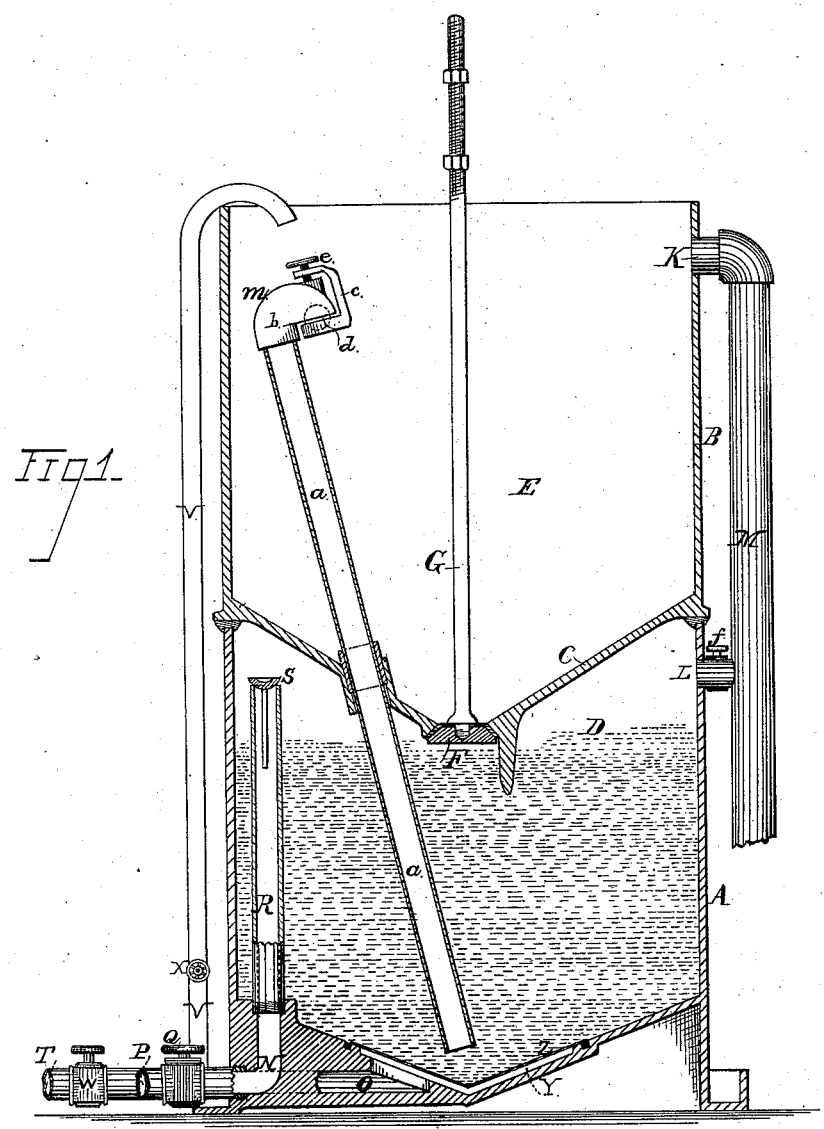

(No Model.)

J. W. HYATT.
ART OF FILTRATION.

No. 293,746. Patented Feb. 19, 1884.

Witnesses;
Chas. C. Gill
Herman Guston

Inventor;
John W. Hyatt,
By his Attorney,
Rowland Cox

UNITED STATES PATENT OFFICE.

JOHN W. HYATT, OF NEWARK, NEW JERSEY.

ART OF FILTRATION.

SPECIFICATION forming part of Letters Patent No. 293,746, dated February 19, 1884.

Application filed May 28, 1883. (No model.)

*To all whom it may concern:*

Be it known that I, JOHN W. HYATT, a citizen of the United States, residing at Newark, in the county of Essex and State of New Jersey, have invented certain new and useful Improvements in the Art of Filtration; and I do hereby declare the following to be a full, clear, and exact description of the invention, such as will enable others skilled in the art to which it appertains to make and use the same.

The invention relates to improvements in the art of filtration, and is especially intended to be utilized in cases where water containing a peculiar quality of impurities is to be treated. It is based upon the discovery that certain classes of filtering material which cannot be be successfully cleansed by washing may be used in small proportions with other things, the material which cannot be successfully cleaned being discarded after it has been loaded with impurities, all as hereinafter more fully described. The material or agent which I use and then discard is distinctive, in that it retains the impurities, so that when it is removed from the filter the impurities are carried away with it. I have found that a great many different materials may be successfully employed in this manner, the essential consideration being that which has just been stated. Among the materials which I have thus used with success are charcoal, asbestus, wood-dust, bone-charcoal, coke, very finely ground sand, and other things. Any material which holds or retains the obnoxious particles, either by reason of its being porous or provided with microscopic projections, or of any other form which will effectuate the objects for which it is used, may be employed. I have found that charcoal and asbestus are particularly desirable; but they differ from other materials only in the degree of their efficiency, and in their adaptability to different purposes. A suitable filter or vessel having been provided, I introduce therein a proper quantity, by preference, of sand or analogous filtering agent, in granular form, combined with a proper proportion of the comminuted substance which it is intended to discard, and proceed with the operation of filtering in the customary manner. After the filter-bed has become foul by the arrestation of silt and other impurities, it will be cleansed, the impurities, together with the more finely comminuted material, being washed away, leaving the coarser agent in the filter. In the operation of washing the filter-bed, the elements composing it will be thoroughly agitated in any convenient way, the effect of which will be to cause the finer particles, which will have become loaded with the impurities not arrested by the coarser agent, to rise with or through the liquid used in washing the bed, and pass away from the filter. The coarser material having been thus relieved, is in condition to be used in connection with a fresh supply of the agent which has been discarded, when the filter will be ready for further use. The proportion of the coarser and finer agents will vary according to circumstances, depending upon the character of the liquid to be filtered; but I have found that in filtering very impure water it will not usually be necessary to make use of more than about, say, five per cent. of the finer material—that is to say, if, say, five per cent. of charcoal, asbestus, or similar material is used in connection with ninety-five per cent. of sand or analogous substance, a very satisfactory result will be attained.

In practicing the invention I do not limit myself to any particular kind of filtering apparatus; but I recommend the employment of some one of the filters which are described and shown in certain Letters Patent of the United States granted to me on the 6th day of March, 1883, and especially the apparatus illustrated in the one numbered 273,542.

In the accompanying drawings I illustrate one form of the filter secured to me by said Letters Patent No. 273,542, which I have employed in connection with the invention sought to be protected by this application with satisfactory results.

I will first describe the general construction of the said filter, and then point out its operation, showing how it may be utilized in practicing the present invention.

Figure 1 of said drawings is a central vertical section of the filter; and Fig. 2 is a detached view, illustrating a means for operating the valve-rod G.

The filter consists of two sections, A B, separated by the diaphragm C, which divides its interior into two compartments, D E. The diaphragm C is provided with a seat to receive the valve F, secured upon the lower end of the rod G, which is adapted to have a vertical movement, for the purpose of opening and closing the valve.

In Fig. 2 I show one means of sustaining the rod G, the same consisting of the cross-bar H, in which the rod is secured, and which is applied on the upper edge of the filter, so as to have a hinged movement, and is supplied on its front end with a pivoted rack, I, arranged to engage a stationary pawl, J. The upper section of the filter is provided with a waste-outlet, K, and the lower section thereof is likewise provided with a waste-outlet, L, having a valve, $f$, both of said outlets being connected, in the present instance, with a single waste escape-pipe, M.

In the lower part of section A of the filter are provided the passages N O, the former of which is connected outside of the filter with a supply-pipe, P, having an ordinary valve, Q, and within the filter with the vertical pipe R, which is furnished at its upper end with the automatically-operating check-valve S. The passage O is in communication, outside of the apparatus, with the delivery-pipe T, which is supplied adjacent to the filter with the vertical pipe V, and beyond this with the valve W, the vertical pipe leading to the upper compartment, E, and being provided with a valve, X. The inner end of the passage O terminates in the recess Y, over which is secured a sheet of perforated metal, wire-cloth, or analogous material, Z.

Within the filter is the transfer-pipe $a$, which passes from the lower part of the compartment D, through the diaphragm C, to the upper portion of the compartment E, as indicated, being provided on its upper end with a valve, $m$, which consists of the knuckle $b$, frame $c$, and elastic ball $d$. The frame $c$, carrying the ball $d$, is inserted over the projecting part of the knuckle, and is there secured, either tightly or loosely, by the set-screw $e$. When, by the movement of the screw $e$, the frame $c$ shall have been loosened on the knuckle $b$, the ball will be thereby separated from its seat within the knuckle, and a free exit for the material that may be passing through the transfer-pipe $a$ will be thus effected; and by tightening the screw $e$ the ball $d$ will be returned to its former position, and the passage through the pipe $a$ thereby closed.

The operation is as follows: The sand or coarser element should be washed before being allowed to enter the lower compartment wherein the filtering is effected, and this washing may be done in the upper compartment by first filling it with water and then introducing the sand. The upper compartment may be filled with water by opening the valves Q X, all of the other valves being closed, and when in this condition the water will enter the lower compartment, D, through the passage N and pipe R, and pass thence to the upper compartment through the perforated metal Z, passage O, and vertical pipe V; or the upper compartment may be filled by simply opening the valves Q and F. After the upper compartment has been filled, the valves Q X are closed, leaving the compartment D also full, and the sand or coarser element of the bed, whatever it may be, is placed in the upper compartment. It will fall to the bottom of the same, displacing a portion of the liquid, which will escape, together with such of the impurities as it may have taken from the sand, through the waste-outlet K. After this the valve $f$ and the valve F are opened, which has the effect of permitting the sand and other coarser agent to descend into the lower compartment, D, and the liquid to escape, with such impurities as it may have taken up, through the valve $f$ to the waste. This step of the process having been concluded, the valves $f$ and F are closed, and the finer agent—such as charcoal, coke, or equivalent material mixed with the liquid until it has attained a semi-liquid consistency—is placed upon the diaphragm C, after which the valves Q $m$ are opened, whereby the liquid is admitted, as before, into the lower compartment, D, and will, on account of the increased internal pressure, gradually move the sand or coarser agent upward through the transfer-pipe $a$ and ball-valve $m$ and deposit it in the upper compartment, E, upon the finer material previously placed therein. After this gradual transfer has been permitted until about three-fourths of the coarser agent has entered the upper compartment, leaving about one-fourth thereof covering the perforated metal in the lower compartment, the valves Q $m$ are closed and the valves F and W opened, and the two filtering materials, which will now have become intermingled, allowed to descend into the lower compartment, when the valve F will be closed and the valve Q opened and the filtering proceeded with immediately; or the valve W may remain closed and the valve X opened for a few minutes, which arrangement will permit the first liquid filtered through the bed to pass through the pipe V into the upper compartment, E, and after this has become full the valve X will be closed and the valve W opened, which will cause the filtered liquid to pass to the regular source of delivery. After the bed of filtering agents has become foul, the delivery-valve W will be closed and the ball-valve $m$ opened, and the elements of the bed will be transferred through the pipe $a$ to the upper compartment, in the manner above described, after which the flow of liquid will be discontinued. This transfer thoroughly agitates and loosens the particles of the two classes or sizes of material from each other and the silt, &c., and the precipitation of the coarser agent or particles causes the impurities and the lighter or finer material to pass off with the water through the waste K, leaving the now-cleaned coarser agent for further use. The coarser agent is now in the condition it was before being allowed to enter the lower compartment, D, upon its first introduction into the filter, and the further operation of the machine is simply a repetition of what has already been accomplished, and need not be again explained. At each washing of the bed the proper quantity of finer agent will be added in the manner above described, so that the best results may be realized from the succeeding filtration. The proportion of sand or coarser agent which is allowed to remain upon the sheet of perforated metal Z during the transfer of the material from the lower compartment upon the finer or lighter material, serves to prevent the escape of the latter through the perforated metal Z when the valve is opened.

In the employment of a bed of filtering agent which is composed of very finely comminuted agents alone, the coarse impurities arrested from the water will soon clog the same and prevent its successful use. Where a filter-bed composed of coarse elements alone is employed, the finer particles of obnoxious material escape with the liquid. By the use of the invention herein described, I am enabled to arrest both the fine and coarse impurities by their appropriate grades of filtering substance, and in such manner that the bed will not become quickly foul, and will admit of its being readily cleansed, the finer particles of the bed which have become intimately combined with the obnoxious material, and which cannot therefore be readily washed, being discarded.

It is not to be understood from the foregoing that only materials of absolutely different specific gravity or of different kinds can alone be successfully employed. I have found that the same kind of material may be used where the relative size of the grains or particles is such that those of the larger size will be of sufficient specific gravity to be retained in the filter while the smaller ones can be discarded. For instance I am able to accomplish good results by using sand in its ordinary condition with what is known as "flour of sand." The same is true of numerous other materials, the only essential consideration being that the finer particles shall be of such a character that they will hold the minute particles of obnoxious material, and at the same time be such that they can be removed from the filter while the larger or coarser grains or particles are retained. I do not therefore limit my claim to any particular material or materials, as it is plain a great variety may be used in a great number of ways; nor do I limit myself to the employment of any special kind of filtering apparatus, nor to the filtration of any particular liquid, although I contemplate employing the invention chiefly in the treatment of water.

What I claim as my invention, and desire to secure by Letters Patent, is—

1. In the art of filtration, the method of arresting impurities from the liquid without either rapidly fouling the filter-bed or permitting the more minute particles of foreign matter to escape, and of cleansing the filter-bed by discarding such portions thereof as have become intimately united with the impurities and washing the remaining portions, which method consists in passing the liquid through a bed composed of fine and coarse agents commingled together, and then agitating the bed and causing the finer elements thereof, together with the impurities, to be carried away by a current of the liquid, substantially as set forth.

2. In the art of filtration, the method of arresting impurities from the liquid without either rapidly fouling the filter-bed or permitting the more minute particles of foreign matter to escape, and of cleansing the filter-bed by discarding such portions thereof as have become intimately united with the impurities and washing the remaining portions, which method consists in passing the liquid through a bed composed of material of varying specific gravity thoroughly commingled, and then agitating the bed and causing the lighter elements thereof, together with the impurities, to be carried away by a current of the liquid, substantially as set forth.

3. In the art of filtration, the method of arresting impurities from the liquid without either rapidly fouling the filter-bed or permitting the more minute particles of foreign matter to escape, and of cleansing the filter-bed by discarding such portions thereof as have become intimately united with the impurities and washing the remaining portions, which method consists in passing the liquid through a filter-bed composed of comminuted charcoal and sand commingled together, and then agitating the bed and causing the charcoal, together with the impurities, to be carried away by a current of the liquid, substantially as set forth.

In testimony whereof I affix my signature in presence of two witnesses.

JOHN W. HYATT.

Witnesses:
CHAS. C. GILL,
HERMAN GUSTOW.